United States Patent
Shaheen et al.

(10) Patent No.: US 10,668,541 B2
(45) Date of Patent: Jun. 2, 2020

(54) TOOL HOLDING SYSTEM HAVING CAPTIVE AND NON-RELEASABLE MEMBERS, METHOD OF MANUFACTURE AND ASSEMBLY OF SAME AND CUTTING TOOL

(71) Applicant: Iscar, Ltd., Tefen (IL)

(72) Inventors: Philip Shaheen, Tarshiha (IL); Raz Fisher, Karkom (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 15/664,537

(22) Filed: Jul. 31, 2017

(65) Prior Publication Data

US 2019/0030618 A1 Jan. 31, 2019

(51) Int. Cl.
*B23B 31/117* (2006.01)
*B23B 31/20* (2006.01)
*B33Y 10/00* (2015.01)
*B33Y 80/00* (2015.01)

(52) U.S. Cl.
CPC .......... *B23B 31/20* (2013.01); *B23B 31/1177* (2013.01); *B23B 31/201* (2013.01);
(Continued)

(58) Field of Classification Search
CPC .............. B23B 31/1177; B23B 31/201; B23B 2231/24; B23B 2260/02; B23B 2260/106;
(Continued)

(56) References Cited

U.S. PATENT DOCUMENTS

| 4,699,388 A | 10/1987 | Sproccati et al. |
| 5,167,476 A | 12/1992 | Lafferty et al. |

(Continued)

FOREIGN PATENT DOCUMENTS

| JP | S63-169205 | 7/1988 |
| WO | WO 2008/054295 | 5/2008 |

OTHER PUBLICATIONS

International Search Report dated Jan. 18, 2019, issued in PCT counterpart application (No. PCT/IL2018/050758).
(Continued)

*Primary Examiner* — Sunil K Singh
*Assistant Examiner* — Paul M Janeski
(74) *Attorney, Agent, or Firm* — Womble Bond Dickinson (US) LLP

(57) ABSTRACT

A cutting tool includes a tool holding system having a clamping portion. The clamping portion includes an integrally formed one-piece inner coupling member that at least partially forms a clamping sleeve portion having a clamping bore for clampingly receiving a cutting insert. The clamping portion also includes an integrally formed one-piece outer coupling member that is circumferentially disposed about at least a portion of the inner coupling member. The tool holding system also has a mounting portion that is connected to one of the inner and outer coupling members. The inner and outer coupling members are captively and non-releasably engaged with each other via inter-engaged first and second engagement surfaces that are slidingly displaceable with respect to each other.

34 Claims, 9 Drawing Sheets

(52) U.S. Cl.
CPC ............... *B33Y 10/00* (2014.12); *B33Y 80/00* (2014.12); *B23B 2231/24* (2013.01); *B23B 2240/36* (2013.01); *B23B 2250/12* (2013.01); *B23B 2260/02* (2013.01); *B23B 2260/072* (2013.01); *B23B 2260/106* (2013.01)

(58) Field of Classification Search
CPC .... B23B 2231/2013; B23B 2231/2016; B23B 2231/2018; B23B 31/1612; B23B 31/20; B23B 2250/12; B33Y 80/00; B33Y 10/00; B24B 2240/36
See application file for complete search history.

(56) References Cited

U.S. PATENT DOCUMENTS

| | | | |
|---|---|---|---|
| 5,522,605 | A | 6/1996 | Lewis et al. |
| 8,029,216 | B2 | 10/2011 | Guy |
| 8,118,312 | B2 | 2/2012 | Walters |
| 8,366,119 | B2 * | 2/2013 | Rimet ................. B23B 31/1071 279/71 |
| 8,672,592 | B2 | 3/2014 | Guy |
| 8,714,893 | B2 | 5/2014 | Taguchi et al. |
| 9,022,393 | B2 | 5/2015 | Guy |
| 2003/0132580 | A1 | 7/2003 | Komine |
| 2007/0296162 | A1 | 12/2007 | Guy |

OTHER PUBLICATIONS

Written Opinion dated Jan. 18, 2019, issued in PCT counterpart application (No. PCT/IL2018/050758).

* cited by examiner

TOOL HOLDING SYSTEM HAVING CAPTIVE AND NON-RELEASABLE MEMBERS, METHOD OF MANUFACTURE AND ASSEMBLY OF SAME AND CUTTING TOOL

FIELD OF THE INVENTION

The subject matter of the present application relates to tool holding systems, in general, and to such tool holding systems having parts that are captively and non-releasably engaged, in particular, and to such parts being manufactured by additive manufacturing further in particular.

BACKGROUND OF THE INVENTION

Tool holding systems can be provided with a clamping portion having a clamping bore for clampingly receiving a cutting insert therein. Typically, in rotary cutting tools, the clamping bore is formed in a clamping sleeve that undergoes an inward radial displacement (i.e. diameter shrinkage) thereby clampingly engaging the cutting insert located in the clamping bore. The inward radial displacement can be actuated by a tightening member, such as a tightening nut.

In some such tool holding systems said diameter shrinkage can be achieved by providing eccentric surface(s) on the clamping sleeve that are urged radially inwardly by tightening of the tightening member.

In some other such tool holding systems the clamping sleeve can be formed by a conical collet, for example, a standard ER collet. Examples of such tool holding systems, are disclosed in, for example, U.S. Pat. Nos. 4,699,388 and 8,118,312. Optionally, to allow precise alignment of the collet, the collet can be detachably connected to an annular collet ring that is rotatably connected to the tightening nut. Examples of such tool holding systems are disclosed in, for example, U.S. Pat. Nos. 5,522,605 and 5,911,421, where the collet ring is rotatably connected to the tightening nut via ball bearings.

SUMMARY OF THE INVENTION

In accordance with a first aspect of the subject matter of the present application there is provided a tool holding system, having a tool holding system central axis defining opposite forward and rear directions, the tool holding system comprising:
 a clamping portion comprising:
  an integrally formed one-piece inner coupling member forming at least part of a clamping sleeve portion having a clamping bore, for clampingly receiving a cutting insert, the clamping bore opening out at a forward end of the tool holding system, the inner coupling member having a radially outwardly facing first engagement surface; and
  an integrally formed one-piece outer coupling member having a radially inwardly facing second engagement surface; and
 a mounting portion connected to one of the inner and outer coupling members; wherein
 the outer coupling member is circumferentially disposed about at least a portion of the inner coupling member, with the first engagement surface facing the second engagement surface;
 the inner and outer coupling members are captively and non-releasably engaged with each other; and
 the first and second engagement surfaces are slidingly displaceable with respect to each other to adjust the inner and outer coupling members between locked and released positions.

In accordance with a second aspect of the subject matter of the present application there is provided a cutting tool comprising:
 a tool holding system of the type described above; and
 a cutting insert located in the clamping bore and clampingly engaged therein.

In accordance with a third aspect of the subject matter of the present application there is provided a method of manufacture and assembly of a tool holding system of the type described above, comprising:
 manufacturing the mounting portion;
 manufacturing, by using an additive manufacturing process, a clamping head part comprising:
  the inner and outer coupling members;
  at least one connecting portion connecting the inner and outer coupling members;
  an annular separation cavity bounded by the inner and outer coupling members and the at least one connecting portion; and
  a clamping head bore opening out to at least the clamping head forward end surface of the clamping head part;
 separating the clamping head part into the inner and outer coupling members; and
 connecting the clamping head part to the mounting portion.

It is understood that the above-said is a summary, and that features described hereinafter may be applicable in any combination to the subject matter of the present application, for example, any of the following features may be applicable to the tool holding system or the cutting tool or the method of manufacture and assembly:

The first and second engagement surfaces can extend circumferentially about the tool holding system central axis. The first and second engagement surfaces can be slidingly displaceable with respect to each other in a circumferential direction about the tool holding system central axis.

The first and second engagement surfaces can be slidingly displaceable with respect to each other in the circumferential direction by no more than 50°.

The first engagement surface can comprise at least one engagement recess recessed therein. The second engagement surface can comprise at least one engagement projection projecting therefrom. Each engagement projection can be located in a respective engagement recess.

The at least one engagement projection can comprise a plurality of angularly spaced apart engagement projections arranged in at least one axial projection row. The at least one engagement recess can comprise a plurality of angularly spaced apart engagement recesses arranged in at least one axial recess row.

Each engagement recess can comprise a central recess bottom surface. Each recess bottom surface can comprise a recess clearance surface and a recess abutment surface adjacent thereto in the circumferential direction. The recess abutment surface can be located further from the tool holding system central axis than the recess clearance surface.

Each engagement projection can comprise a central projection top surface. Each projection top surface can have a constant radial distance from the tool holding system central axis.

The first engagement surface can comprise at least one engagement projection projecting therefrom. The second engagement surface can comprise at least one engagement recess recessed therein. Each engagement projection can be located in a respective engagement recess.

The first engagement surface can be located on the inner coupling member and face radially outwardly. The second engagement surface can be located on the outer coupling member and face radially inwardly.

The outer coupling member can form a tightening nut.

The inner coupling member can be integrally connected with the mounting portion forming a tool body having a one-piece construction.

The outer coupling member can comprise a radially inwardly facing outer threaded portion. The mounting portion can comprise a radially outwardly facing mounting threaded portion. The outer threaded portion can be threadingly engaged to the mounting threaded portion.

The inner coupling member can form in entirety the clamping sleeve portion.

The inner coupling member can form a sliding collet ring. The clamping sleeve portion can further comprise a collet that is releasably attached to the inner coupling member. The clamping bore can be located in the collet.

The tool holding system can further comprise at least one coolant channel opening out at the forward end of the tool holding system.

Each coolant channel can be formed in the inner coupling member and extend an entire axial length thereof.

The inner coupling member can comprise at least one axially extending coolant ridge. Each coolant channel can be located in a coolant ridge.

The first engagement surface can comprise a plurality of angularly spaced apart engagement recesses. Members of each pair of circumferentially adjacent engagement recesses can be separated by a respective coolant ridge.

The inner coupling member can comprise a coolant groove that extends the entire axial length of the inner coupling member. Each coolant channel can be formed by the coolant groove and the outer coupling member.

Each projection top surface can abut a respective recess abutment surface.

The method can comprise manufacturing the clamping head part to have exactly two connecting portions connecting the inner and outer coupling members so that the separation cavity can be entirely closed.

The step of separating the clamping head part into the inner and outer coupling members can comprise removing the at least one connecting portion.

The step of removing the at least one connecting portion can comprise:
i) in the clamping head part, face grooving a separation groove which extends to the separation cavity; or
ii) grinding the clamping head part to the separation cavity; or
iii) in the clamping head part, external grooving a separation groove which extends to the separation cavity; or
iv) in the clamping head bore, internal grooving a separation groove which extends to the separation cavity.

The method can comprise manufacturing the mounting portion with a non-additive manufacturing process.

The method can comprise manufacturing the mounting portion with an additive manufacturing process.

The method can comprise connecting the clamping head part to the mounting portion by additively manufacturing the clamping head part directly onto the mounting portion.

The method can comprise connecting the clamping head part to the mounting portion by manufacturing the mounting portion and the clamping head part together in a single additive manufacturing process.

The method can comprise manufacturing the mounting portion and the clamping head part separately. Then connecting the clamping head part to the mounting portion.

The method can further comprise:
releasably attaching a collet to the inner coupling member after separating the clamping head part into the inner and outer coupling members; wherein:
connecting the clamping head part to the mounting portion comprises threadingly attaching the outer coupling member to the mounting portion after releasably attaching the collet to the inner coupling member.

BRIEF DESCRIPTION OF THE FIGURES

For a better understanding of the present application and to show how the same may be carried out in practice, reference will now be made to the accompanying drawings, in which.

Figure 1:
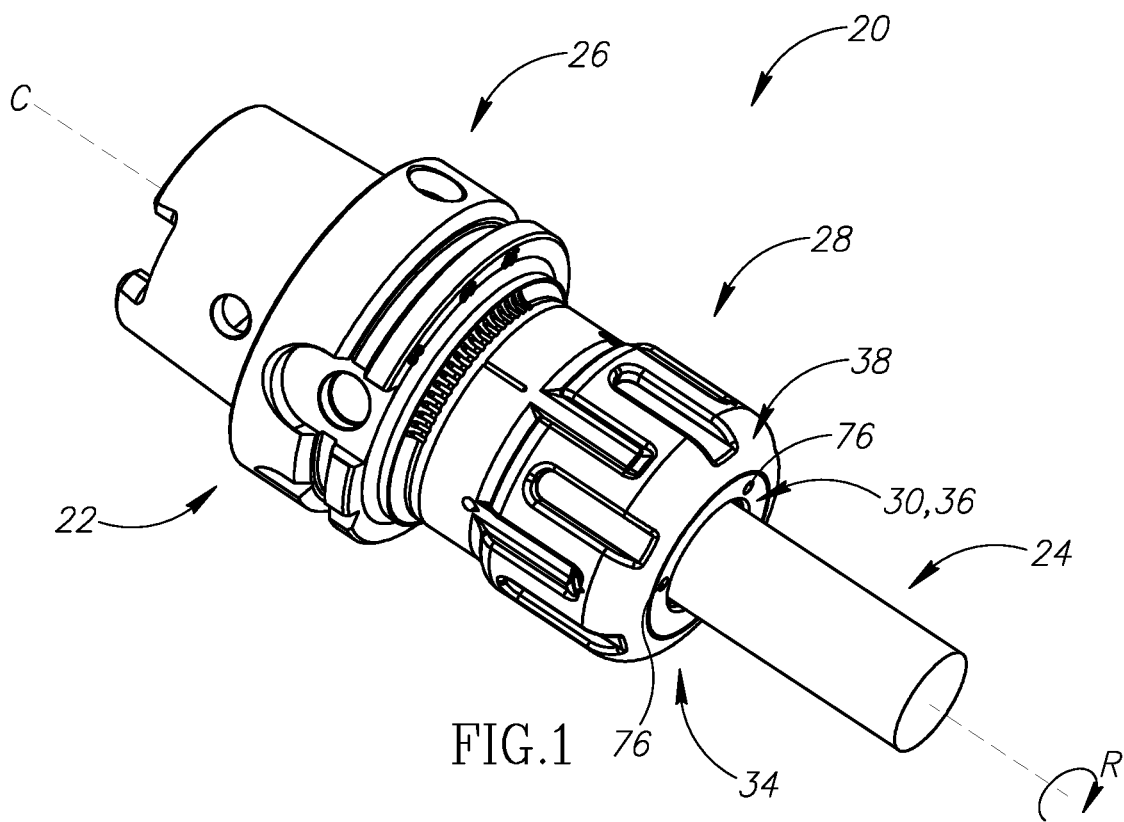
FIG. 1 is a perspective view of a cutting tool in accordance with a first embodiment of the present application.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Attention is first drawn to FIG. 1 showing a cutting tool 20, 120, for chip removal, depicting an aspect of the present application. In this non-limiting example shown in the drawings, the cutting tool 20, 120 is a rotary cutting tool. In particular, the rotary cutting tool is a drilling tool, suitable for drilling cutting operations. However, the subject matter of the present application is not restricted only to drilling cutters and could also be applicable to, for example but not limited to, milling tools. Moreover, the cutting tool 20, 120 could be a non-rotary cutting tool, such as, but not limited to, a turning tool. The cutting tool 20, 120 has a tool longitudinal axis C. In accordance with some embodiments of the subject matter of the present application, the cutting tool 20, 120 can be rotatable in a direction of rotation R about the tool longitudinal axis C. The cutting tool 20, 120 includes a tool holding system 22, 122. The cutting tool 20, 120 also includes a cutting insert 24 clampingly engaged to the tool holding system 22, 122. The cutting insert 24 is designed to perform metal cutting operations and has a cutting edge (not shown) for the purpose thereof. In this non-limiting example shown in the drawings, the cutting insert 24 is a drill bit.

Figure 2:
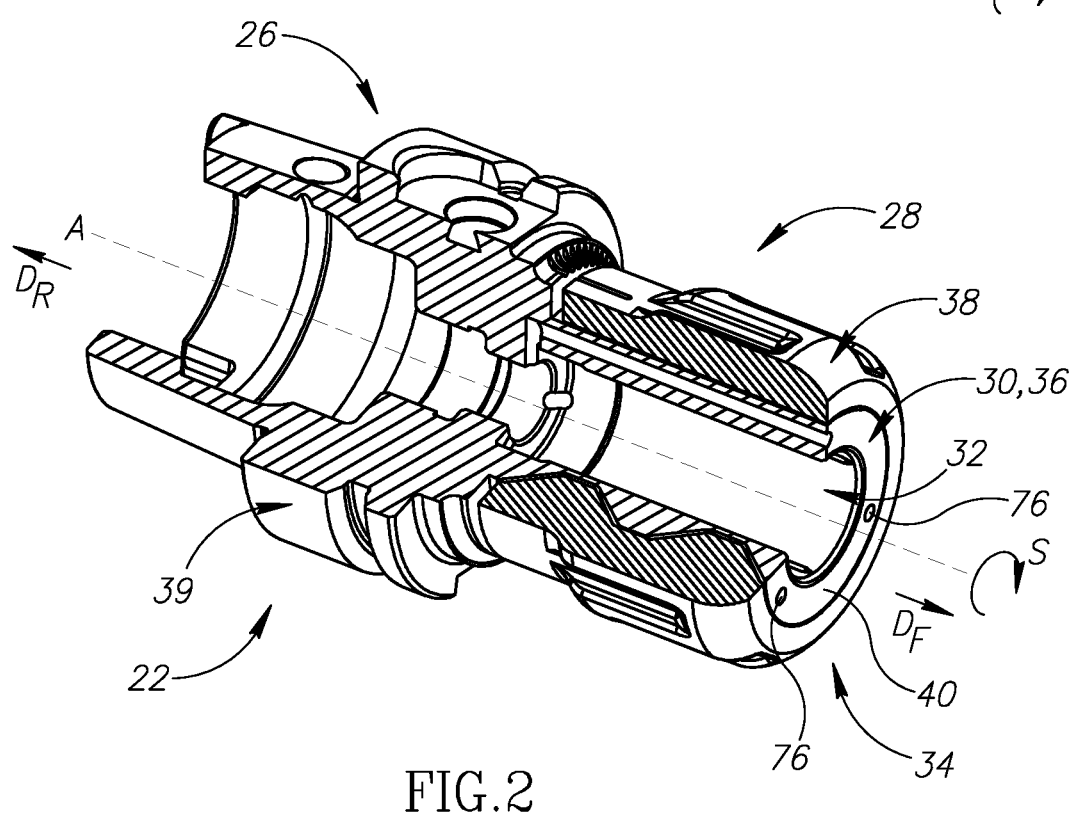
FIG. 2 is a perspective view of a tool holding system, partially cut away, in accordance with the first embodiment of the present application.

Reference is now made to FIG. 2, showing the tool holding system 22, 122, depicting another aspect of the present application. The tool holding system 22, 122 has a tool holding system central axis A. The tool holding system central axis A defines opposite forward and rear directions $D_F$, $D_R$. In accordance with some embodiments of the subject matter of the present application, the tool holding system central axis A can be co-incident with the tool longitudinal axis C.

Figure 5:
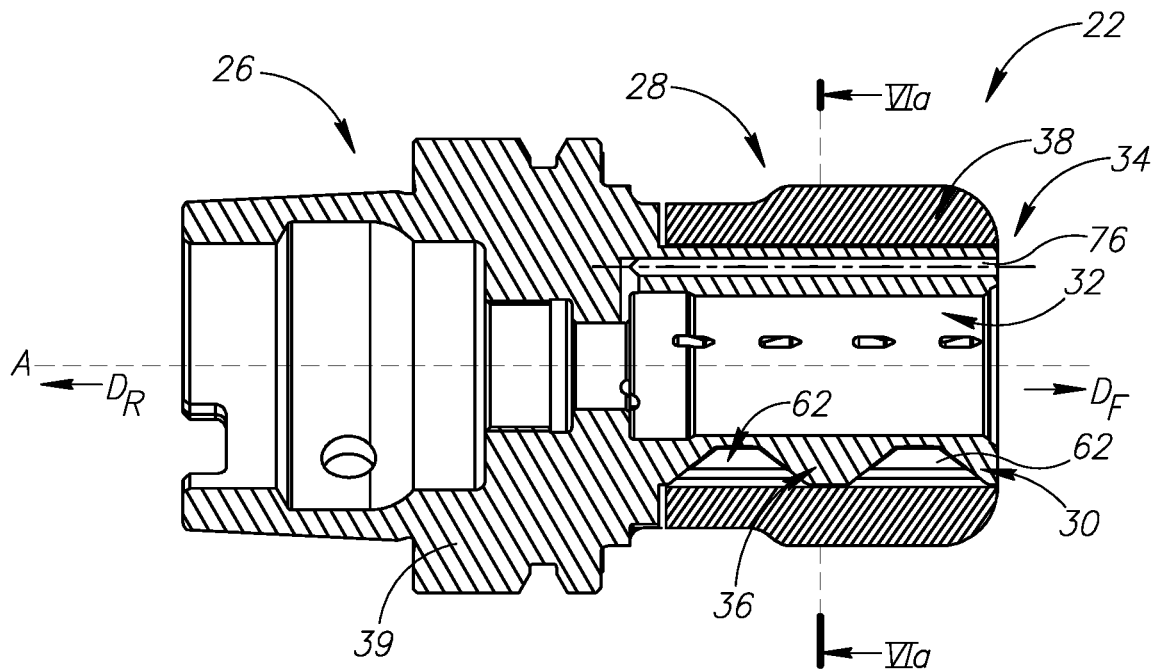
FIG. 5 is an axial cross-sectional view of the tool holding system shown in FIG. 2.
Figure 16:
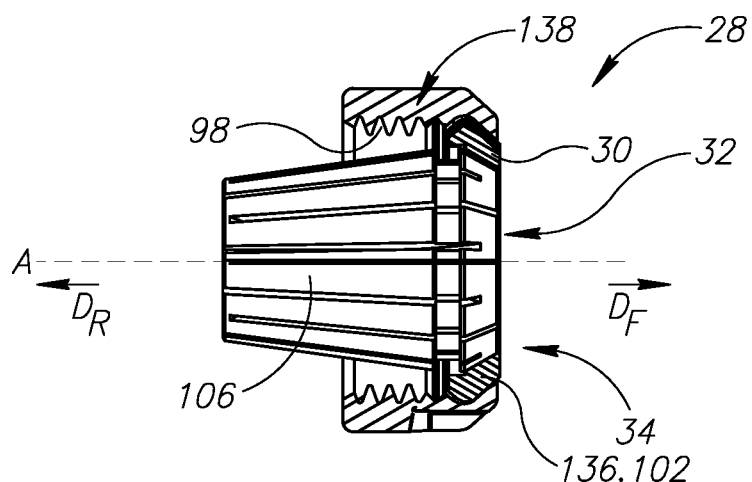
FIG. 16 is a cross-sectional view taken along the line XVII-XVII in FIG. 15.
Figure 17:
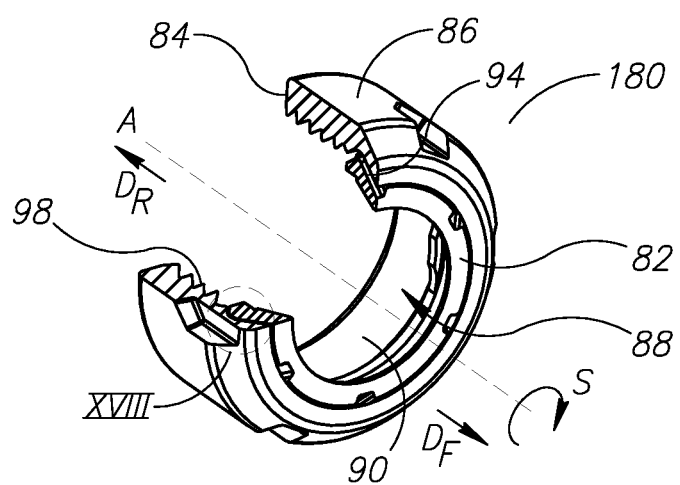
FIG. 17 is a perspective view of the clamping head part, partially cut away, showing the inner and outer coupling members before separation.
Figure 18:
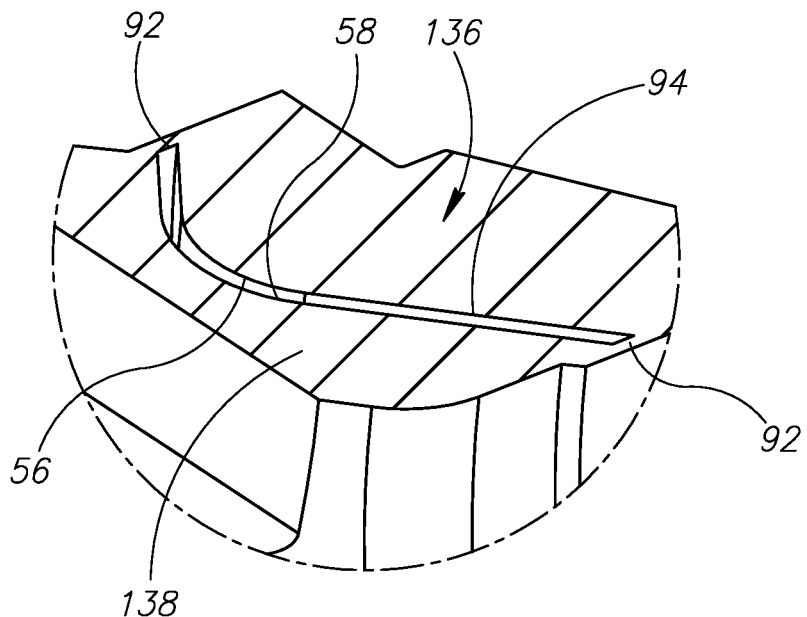
FIG. 18 is a detail of FIG. 17 indicated by "XVIII"
Figure 19:
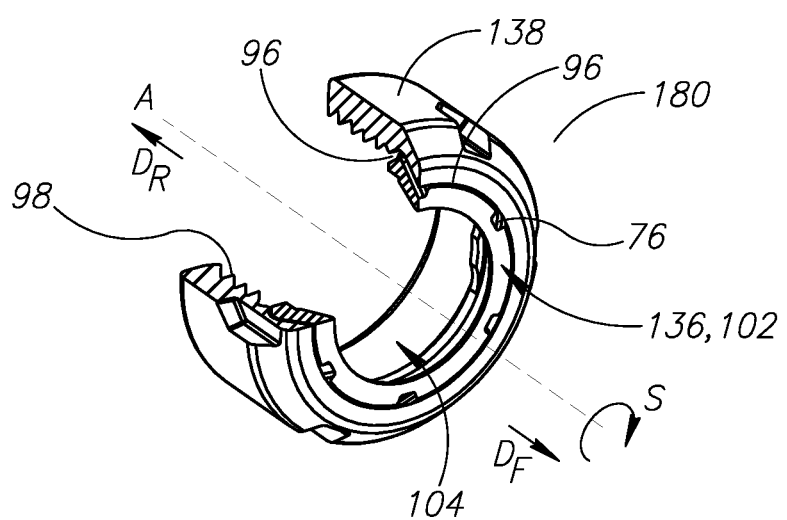
FIG. 19 is an analogous view of FIG. 17, after separation the inner and outer coupling members.

It should be noted that use of the terms "forward" and "rearward" throughout the description and claims refer to a relative position in a direction of the tool holding system central axis A towards the left and right, respectively, in FIGS. 5 and 16. In the present disclosure, "forward" is associated with the cutting end of the cutting tool 20, 120. It should further be noted that use of the terms "axial" and "radial" throughout the description and claims are with respect to the tool holding system central axis A, unless otherwise stated.

The tool holding system 22, 122 includes a mounting portion 26 and a clamping portion 28 connected thereto. In the case of rotary cutting tools, for example, the mounting portion 26 is designed to be connected to a torque transferring system (such as a spindle, not shown) in order to rotate the cutting tool 20, 120.

Referring to FIG. 2, the clamping portion 28 includes an integrally formed one-piece inner coupling member 36, 136. The clamping portion 28 also includes an integrally formed one-piece outer coupling member 38, 138. The outer coupling member 38, 138 is circumferentially disposed about at least a portion of the inner coupling member 36, 136.

The mounting portion 26 is connected to one of the inner and outer coupling members 36, 136; 38, 138. In accordance with the first embodiment of the subject matter of the present application, the inner coupling member 36 can be integrally connected with the mounting portion 26 forming a tool body 39 having a one-piece construction.

Figure 3:
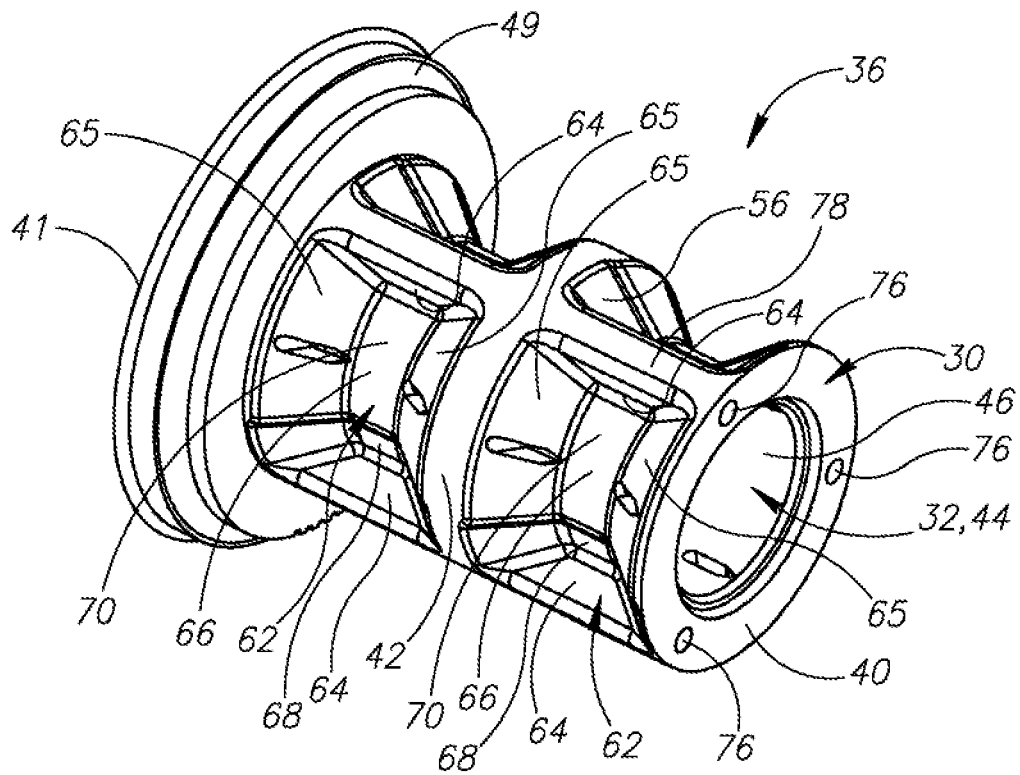
FIG. 3 is a perspective view of an inner coupling member shown in FIG. 2.

Referring now to FIG. 3, the inner coupling member 36, 136 forms at least part of a clamping sleeve portion 30 which includes a clamping bore 32. The clamping bore 32 is designed for clampingly receiving a cutting insert 24. The clamping bore 32 opens out at a forward end 34 of the tool holding system 22, 122. In accordance with some embodiments of the subject matter of the present application, the inner coupling member 36, 136 can include two opposite (forward and rear) inner end surfaces 40, 41 and an inner peripheral surface 42 extending therebetween. The inner peripheral surface 42 can extend circumferentially about the tool holding system central axis A. The inner coupling member 36, 136 can include an inner bore 44 that can open out at least to the forward inner end surface 40. The inner bore 44 can be defined by an inner bore wall surface 46. It is noted that in the configuration where the inner coupling member 36 is integrally connected with the mounting portion 26, the rear inner end surface 41 is an imaginary surface that is located where the mounting portion 26 merges (i.e. transitions) into the inner coupling member 36.

In accordance with the first embodiment of the subject matter of the present application, the inner coupling member 36 can form in entirety the clamping sleeve portion 30. That is to say, the clamping sleeve portion 30 is formed from no other part except the inner coupling member 36. Advantageously, this provides for a tool holding system 22 with only two distinct parts, with no need for assembly with additional parts. In such a configuration, the inner bore 44 can form the clamping bore 32. The inner coupling member 36 can include an inner base portion 49 at a rear end thereof. The inner base portion 49 can define the maximum radial dimension of the inner coupling member 36. The outer coupling member 38 can be circumferentially disposed about a portion of the inner coupling member 36 that does not include the inner base portion 49.

Figure 4:
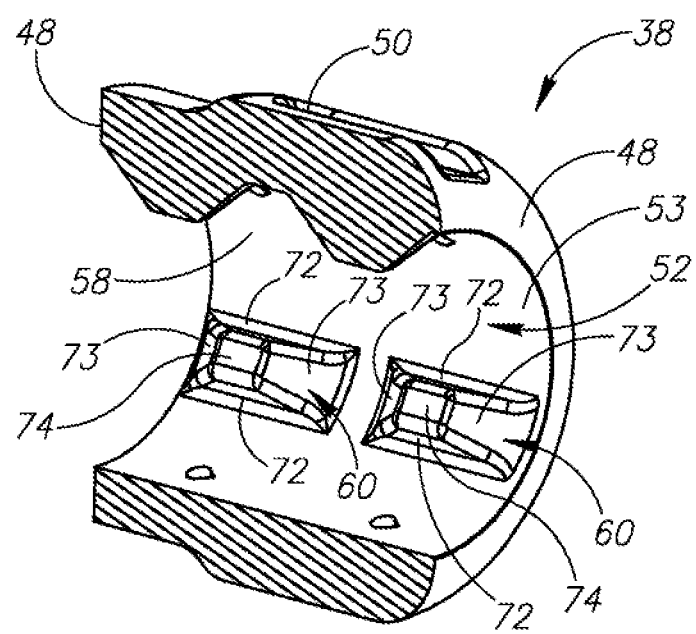
FIG. 4 is a perspective view of an outer coupling member, partially cut away, shown in FIG. 2.

Referring now to FIG. 4, in accordance with some embodiments of the subject matter of the present application the outer coupling member 38, 138 can include two opposite (forward and rear) outer end surfaces 48 and an outer peripheral surface 50 extending therebetween. The outer peripheral surface 50 can extend circumferentially about the tool holding system central axis A. The outer coupling member 38, 138 can include an outer through bore 52 that can extend between, and open out to, the two outer end surfaces 48. The outer through bore 52 can be defined by an outer through bore wall surface 53 that faces radially inwardly. The inner coupling member 36, 136 can be located at least partially in the outer through bore 52. The outer coupling member 38, 138 can form a tightening nut 54.

Referring to FIGS. 3 and 4, the inner coupling member 36, 136 has a radially outwardly facing first engagement surface 56. While the outer coupling member 38, 1.38 has a radially inwardly facing second engagement surface 58. The first and second engagement surfaces 56, 58 can extend around the entire circumferential extent of the inner or outer coupling member 36, 136; 38, 138 upon which it is located. As shown in FIG. 2, the inner and outer coupling members 36, 136; 38, 138 are captively and non-releasably engaged via inter-engaged first and second engagement surfaces 56, 58. As seen in the figures, the inner and outer coupling members 36, 136; 38, 138 are captively and non-releasably engaged with each other, without the use of a separate retaining element keeping the two together. The first and second engagement surfaces 56, 58 are slidingly displaceable with respect to each other to adjust the inner and outer coupling members between locked and released positions.

In accordance with some embodiments of the subject matter of the present application, the first and second engagement surface 56, 58 can extend circumferentially about the tool holding system central axis A. The first and second engagement surfaces 56, 58 can face each other. The first and second engagement surfaces 56, 58 can be slidingly displaceable with respect to each other in a circumferential direction S about the tool holding system central axis A. Thus, the first and second engagement surfaces 56, 58 can be slidingly rotatable with respect to each other. The circumferential direction S and the direction of rotation R can be co-directional.

In accordance with the first embodiment of the subject matter of the present application, the inner coupling member's first engagement surface 56 can include at least one engagement recess 62 recessed therein. The outer coupling member's second engagement surface 58 can include at least one radially inwardly facing engagement projection 60 projecting therefrom. Referring to FIGS. 2 and 5, each engagement projection 60 can be located in a respective engagement recess 62. Thus, the first and second engagement surfaces 56, 58 can be inter-engaged.

As seen in FIG. 3, in accordance with the first embodiment of the subject matter of the present application, the at least one engagement projection 60 can includes a plurality of angularly spaced apart engagement projections 60 arranged in at least one axial projection row. The at least one engagement recess 62 can include a plurality of angularly spaced apart engagement recesses 62 arranged in at least one axial recess row. In the non-limiting example shown in the drawings, there are exactly two axial projection rows and two axial recess rows.

Figure 6A:
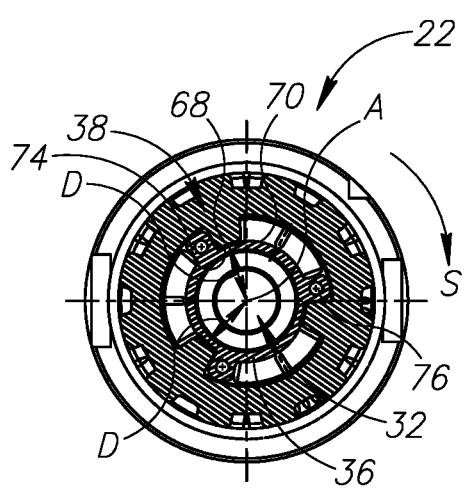
FIG. 6a is an axially perpendicular cross-sectional view taken along the line VIa-VIa in FIG. 5, when the tool holding system is in a released position.
Figure 6B:
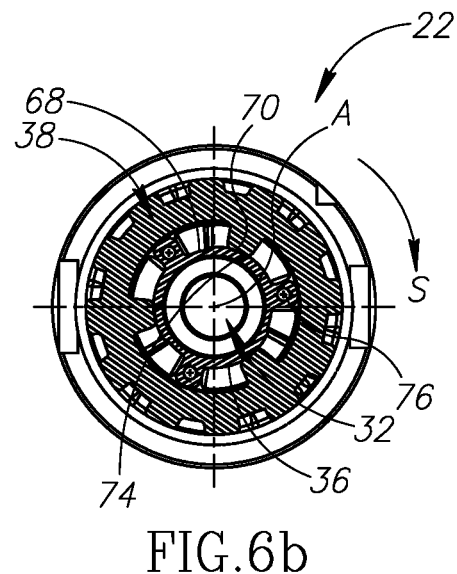
FIG. 6b is an analogous view of FIG. 6a, when the tool holding system is in a locked position.

Each engagement recess 62 can include two angularly spaced apart recess side walls 64 and a central recess bottom surface 66 that extends therebetween. Each recess bottom surface 66 can include a recess clearance surface 68 and a recess abutment surface 70. The recess abutment surface 70 can be adjacent to the recess clearance surface 68 in the circumferential direction S. As seen in FIGS. 3, 6a and 6b, the recess abutment surface 70 can be located further from the tool holding system central axis A than the recess clearance surface 68 in the radial direction. Each engagement recess 62 can include two opposite axially spaced apart recess axial side walls 65.

As seen in FIG. 4, each engagement projection 60 can include two angularly spaced apart projection side walls 72 and a central projection top surface 74 that extends therebetween. Each projection top surface 74 can have a constant radial distance D from the tool holding system central axis A. Each engagement projection 60 can include two opposite axially spaced apart projection axial side walls 73. Contact between one or more of the recess axial side walls 65 and one or more of the projection axial side walls 73 prevent axial displacement of the outer coupling member 38, 138 with respect to the inner coupling member 36, 136.

Reverting to FIG. 3, in accordance with the first embodiment of the subject matter of the present application, the radially outwardly facing first engagement surface 56 can be located on the inner peripheral surface 42 of the inner coupling member 36. And as seen in FIG. 4, the radially inwardly facing second engagement surface 58 can be located on the outer through bore wall surface 53 of the outer coupling member 38.

Referring to FIGS. 2 and 5, in accordance with some embodiments of the subject matter of the present application, the tool holding system 22, 122 can include at least one coolant channel 76 that opens out at the forward end 34 of the tool holding system 22, 122. The coolant channel 76 is designed to allow delivery of a cooling fluid to the cutting portion of the cutting insert 24.

In accordance with the first embodiment of the subject matter of the present application, each coolant channel 76 can be formed in the inner coupling member 36 and extend an entire axial length thereof. Each coolant channel 76 can open out to the forward inner end surface 40. The inner coupling member 36 can include at least one axially coolant ridge 78. Each coolant ridge 78 can extend in the axial direction. Each coolant channel 76 can be located in a coolant ridge 78. Members of each pair of circumferentially adjacent engagement recesses 62 can be separated by a respective coolant ridge 78.

The tool holding system 22, 122 is adjustable between a released and locked position. In the released position of the tool holding system 22, 122, the clamping bore 32 has clearance to allow the cutting insert 24 to be inserted therein. In the locked position of the tool holding system 22, 122, the cutting insert 24 is located in the clamping bore 32 and clampingly engaged therein, forming the cutting tool 20, 120.

In accordance with the first embodiment of the subject matter of the present application, to adjust the tool holding system 22, 122 between a released and locked position the first and second engagement surfaces 56, 58 can be slidingly displaced with respect to each other in the circumferential direction S about the tool holding system central axis A by no more than 50°. Further rotation can be prevented by contact between the projection and recess side walls 72, 64. Alternatively, rotation can be prevented by tight abutment between projection top surface 74 and a respective recess abutment surface 70.

As mentioned earlier in the description, one aspect of the present invention relates to the cutting tool 20, 120, where the cutting insert 24 is located in the clamping bore 32 and clampingly engaged therein. When the tool holding system 22 is in the locked position, in accordance with the first embodiment of the subject matter of the present application, each projection top surface 74 can abut a respective recess abutment surface 70. Thus, the clamping sleeve portion 30 is urged in the radial inward direction so that the cutting insert 24 is clampingly engaged in the clamping bore 32.

Figure 7:
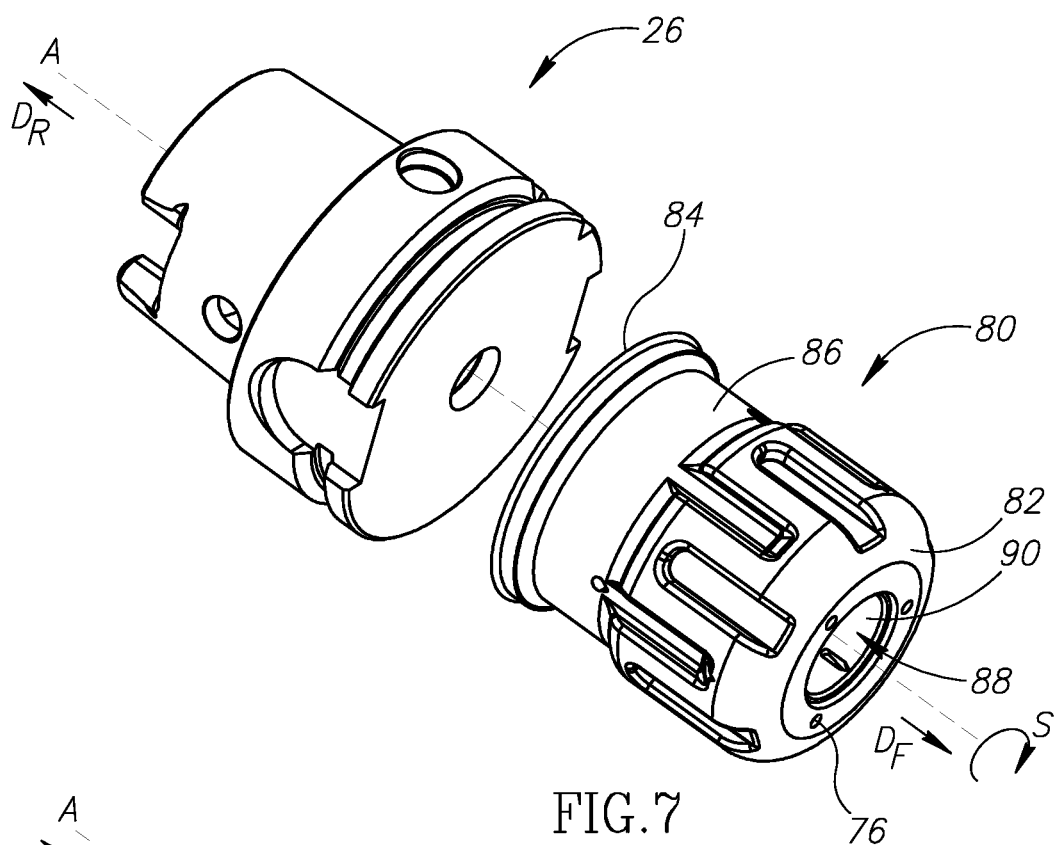
FIG. 7 is a perspective view of a mounting portion and a separate clamping head part in accordance with the first embodiment of the present application.

A third aspect of the present application includes a method of manufacture and assembly of the tool holding system 22, 122. Reference is made to FIG. 7, showing a clamping head part 80 and the mounting portion 26 in accordance with the first embodiment, although the method is also applicable for the other embodiments. The method includes manufacturing the mounting portion 26. In accordance with some embodiments of the subject matter of the present application, the step of manufacturing the mounting portion 26 can include a non-additive manufacturing process. Alternatively, the step of manufacturing the mounting portion 26 can include an additive manufacturing process.

It should also further be noted that use of the term "additive manufacturing process" throughout the description and claims refers to refers to processes used to create a three-dimensional object in which layers of material are formed to create an object. Examples of such processes include, but are not limited to, Selective Laser Melting (SLM), Selective Laser Sintering (SLS), Direct Metal Laser Sintering (DMLS), Fused Deposition Modeling (FDM) and 3D Printing.

The method includes the step of manufacturing the clamping head part 80, 180, by using an additive manufacturing process. The clamping head part 80, 180 includes clamping head forward and rear end surfaces 82, 84 and a clamping head peripheral surface 86 that extends therebetween. The clamping head part 80, 180 includes a clamping head bore 88, recessed in, and opening out to, at least the clamping head forward end surface 82. The clamping head bore 88 can open out to the clamping head forward and rear end surface 82, 84. The clamping head bore 88 is defined by a clamping head bore wall surface 90. The clamping head part 80, 180 is formed from the inner and outer coupling members 36, 136; 38, 138 which are connected by at least one connecting portion 92. Each connecting portion 92 can be annular in shape. Each connecting portion 92 can be located at an axial end (i.e. forward or rear end) of one or both of the inner and outer coupling members 36, 136; 38, 138. The clamping head bore 88 corresponds to the inner bore 44. The clamping head peripheral surface 86 corresponds to the outer peripheral surface 50 and optionally a portion of the inner peripheral surface 42.

It is noted that, except in the case where the clamping head part 80 is manufactured directly onto the mounting portion 26 (as described further on in the description), the order of two steps (i.e. manufacturing the mounting portion 26 and the clamping head part 80) can be swapped. It is also noted that in such a case, one of the clamping head forward end surfaces 82 is an imaginary surface that is located where the mounting portion 26 merges (i.e. transitions) into the clamping head part 80.

Figure 9:
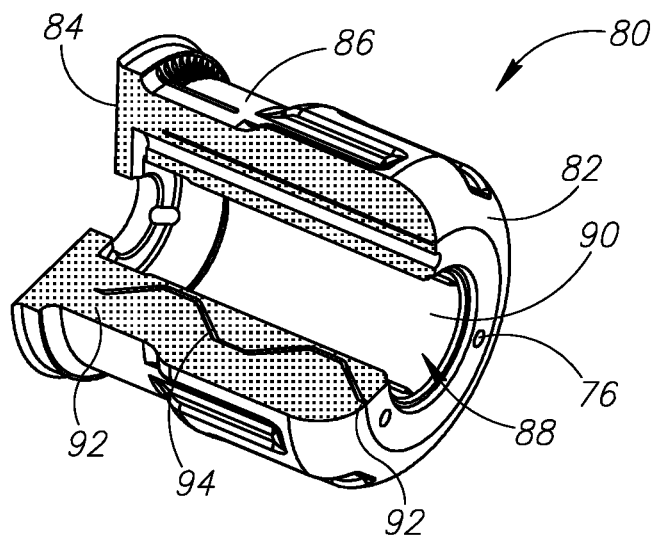
FIG. 9 is a perspective view of the clamping head part, partially cut away, showing the inner and outer coupling members before separation.

Referring to FIG. 9, the clamping head part 80, 180 includes an annular separation cavity 94 that is bounded by the inner and outer coupling members 36, 136; 38, 138 and the at least one connecting portion 92. The first and second engagement surfaces 56, 58 are spaced apart by the separation cavity 94. Thus, the shape of the separation cavity 94 is laterally defined by the shape of the first and second engagement surfaces 56, 58. Optionally, the inner and outer coupling members 36, 136; 38, 138 can be connected by exactly two connecting portions 92 so that the separation cavity 94 is entirely closed. The separation cavity 94 can have a slit-like shape.

Figure 10:
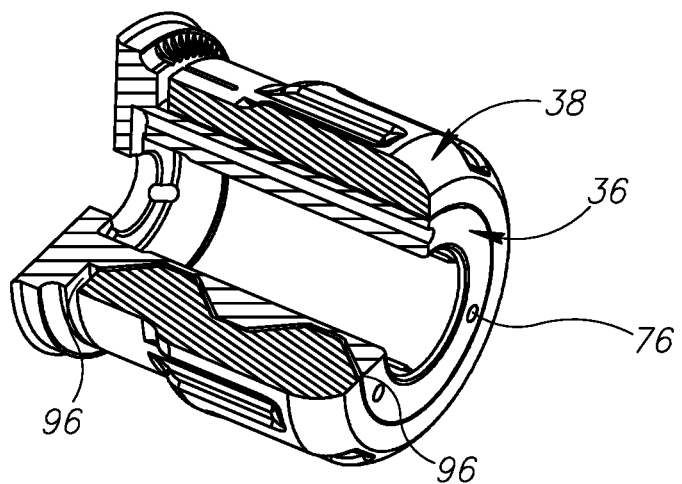
FIG. 10 is an analogous view of FIG. 9, after separation of the inner and outer coupling members.

Referring to FIG. 10, the method includes separating the clamping head part 80, 180 into the inner and outer coupling members 36, 136; 38, 138. In accordance with some embodiments of the subject matter of the present application, the step of separating the clamping head part 80, 180 can include removing the at least one connecting portion 92. The step of removing the at least one connecting portion 92 can include one of the following: i) in the clamping head part 80, 180, face grooving a separation groove 96 which extends to the separation cavity 94, or ii) grinding the clamping head part 80, 180 to the separation cavity 94, or iii) in the clamping head part 80, 180, external grooving a separation groove 96 which extends to the separation cavity 94, or iv) in the clamping head part 80, 180, internal grooving a separation groove 96 which extends to the separation cavity 94.

The method further includes the step of connecting the clamping head part 80, 180 to the mounting portion 26 either i) during or after the step of manufacturing the clamping head part 80, 180 or ii) after the step separating the clamping head part 80, 180.

Figure 8:
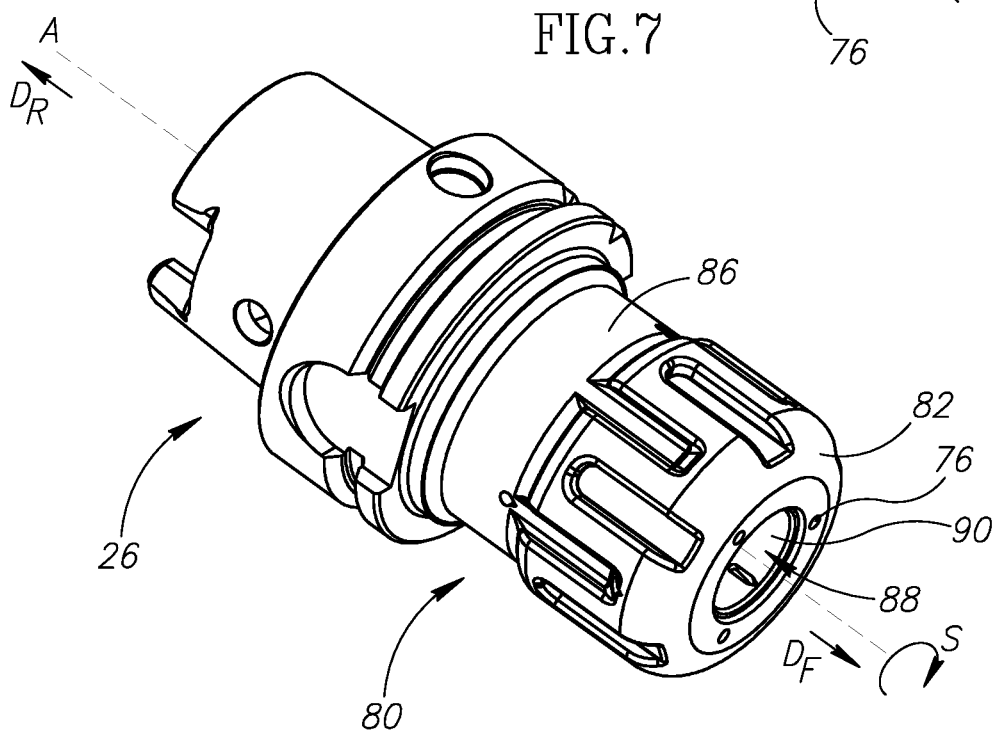
FIG. 8 is a perspective view of the clamping head part connected to the mounting portion.

Referring to FIG. 8, in accordance with the first embodiment of the subject matter of the present application, the step of connecting the clamping head part 80 to the mounting portion 26 can be performed during the step of manufacturing the clamping head part 80 by additively manufacturing the clamping head part 80 directly onto the mounting portion 26. Moreover, when the mounting portion 26 is additively manufactured, the mounting portion 26 and the clamping head part 80 can be manufactured together in a single additive manufacturing process. Alternatively, the mounting portion 26 and the clamping head part 80 can be manufactured separately. The step of connecting the clamping head part 80 to the mounting portion 26 can include for example, brazing the parts together.

Figure 12:
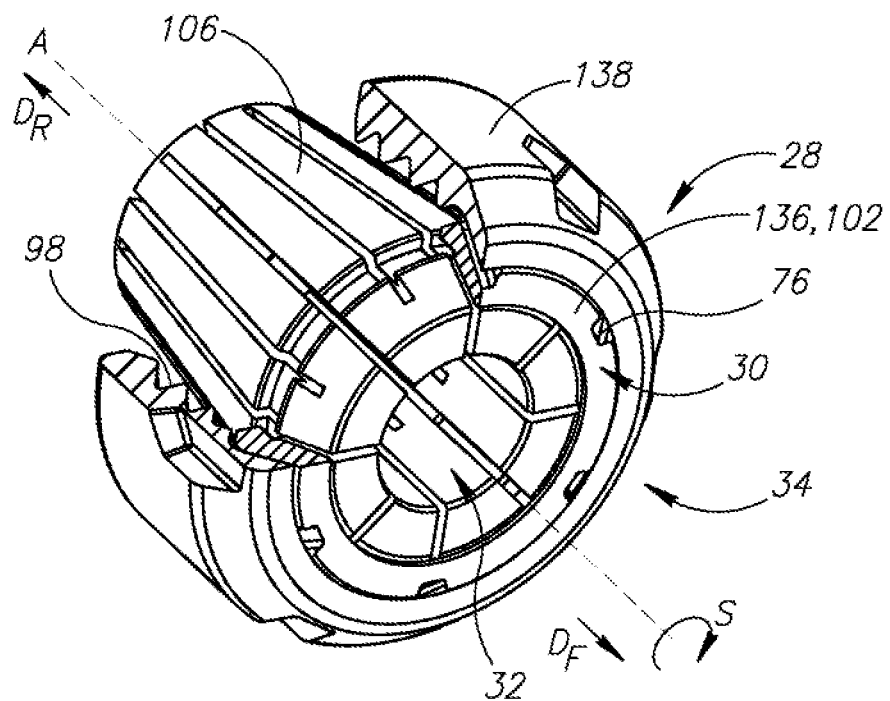
FIG. 12 is a perspective view of a clamping portion of the tool holding system, with a cut away section, in accordance with the second embodiment of the present application.

A second embodiment of the invention is described below. As seen in FIG. 12, the outer coupling member 138 can be circumferentially disposed about the entire inner coupling member 136. Referring to FIGS. 13 to 16, the at least one engagement recess 62 can include an annular groove 108. The at least one engagement projection 60 can include an annular ridge 110. The first engagement surface 56 can be located on the inner coupling member 136 and face radially outwardly. Specifically, the first engagement surface 56 can be located on the inner peripheral surface 42. The second engagement surface 58 can be located on the outer coupling member 138 and face radially inwardly. Specifically, the second engagement surface 58 can be located on the outer through bore wall surface 53.

Reverting to FIG. 12, the inner coupling member 136 can form a sliding collet ring 102 which is directly slidingly displaceable with respect to the tightening nut 54. Advantageously, this provides for a tool holding system 22 with no need for post-assembly with additional parts, such as ball bearings. In such a configuration, the inner bore 44 can form the clamping bore 32. The inner bore 44 can open out to both of the two opposite inner end surfaces 40, 41 forming a ring through bore 104. The clamping portion 28 can further include a collet 106. The clamping bore 32 can be located in the collet 106. The collet 106 can be releasably attached to the sliding collet ring 102 at the ring through bore 104.

Figure 13:
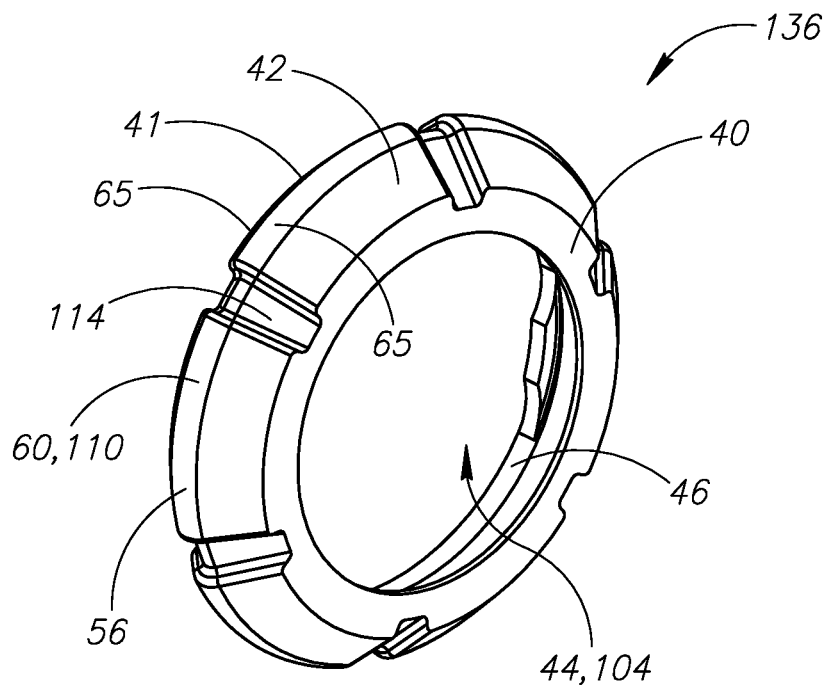
FIG. 13 is a perspective view of the inner coupling member shown in FIG. 12.
Figure 14:
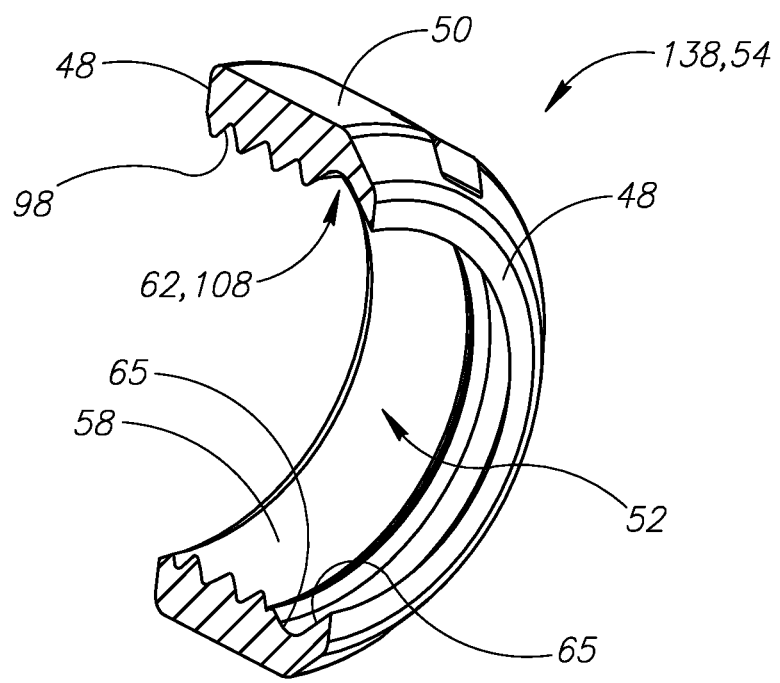
FIG. 14 is a perspective view of the outer coupling member, partially cut away, shown in FIG. 12.
Figure 15:
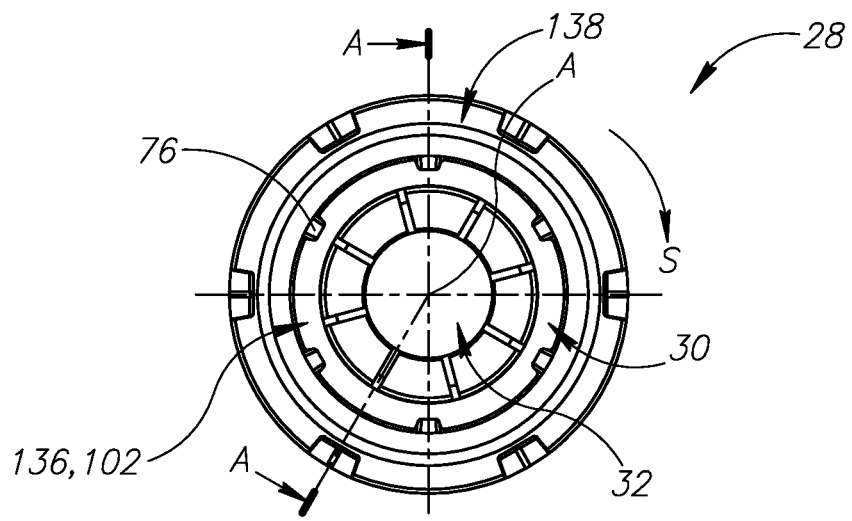
FIG. 15 is a front view of the clamping portion shown in FIG. 12.

As seen in FIG. 13, in accordance with the second embodiment of the subject matter of the present application, the inner coupling member 136 can include a coolant groove 114 that extends the entire axial length of the inner coupling member 136. For example, coolant groove 114 can be located in the inner peripheral surface 42. Each coolant channel 76 can be formed by the coolant groove 114 and the outer coupling member 138. Alternatively, each coolant channel 76 can be formed by the coolant groove 114 and the cutting insert 24.

Figure 11:
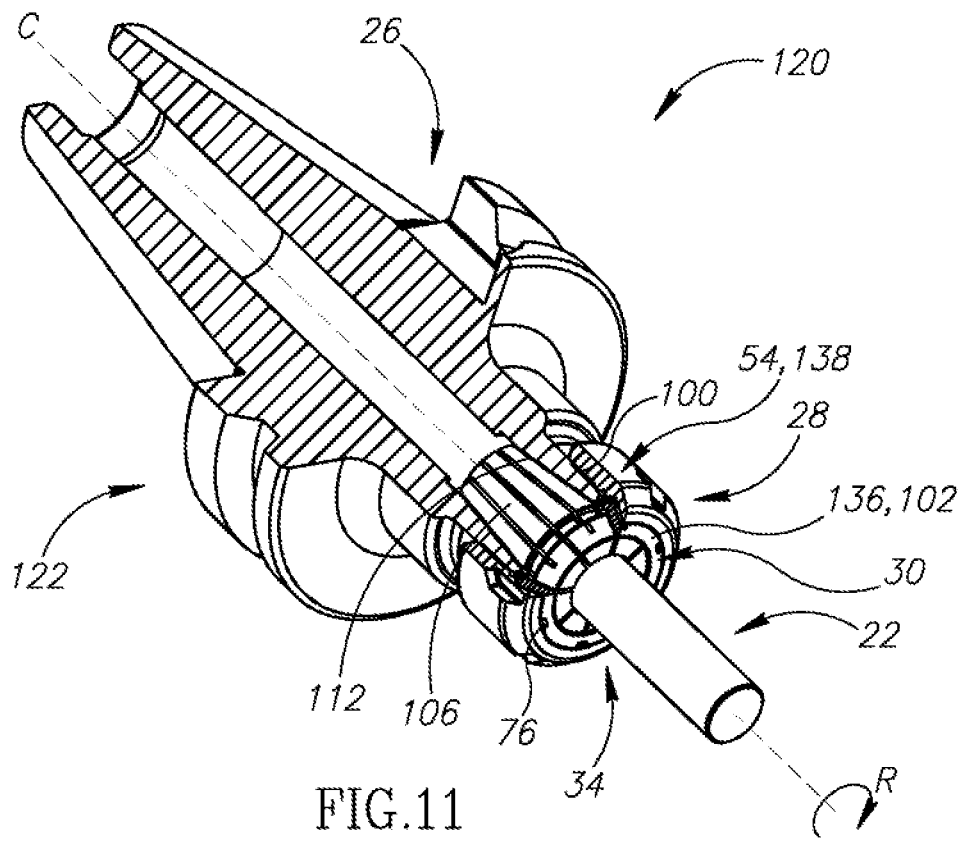
FIG. 11 is a perspective view of the cutting tool, partially cut away, in accordance with a second embodiment of the present application.

In accordance with the second embodiment of the subject matter of the present application, to adjust the tool holding system 122 between a released and locked position, the collet 106 is urged in the radial inward direction via a conical receiving bore 112, by turning the tightening nut 54 (i.e., the outer coupling member 138), so that the cutting insert 24 is clampingly engaged in the clamping bore 32 as shown in FIG. 11 (as is well known in the art).

Reference is now made to FIG. 11. The outer coupling member 138 can include a radially inwardly facing outer threaded portion 98. The mounting portion 26 can include a radially outwardly facing mounting threaded portion 100. The method can further include releasably attaching a collet 106 to the inner coupling member 136 after separating the clamping head part 180 into the inner and outer coupling members 136, 138. The step of connecting the clamping head part 80 to the mounting portion 26 can include threadingly attaching the outer coupling member 138 to the mounting portion 26 after the step of releasably attaching the collet 106 to the inner coupling member 136.

It should be noted that one feature of the subject matter of the present application is that since the inner and outer coupling members 36, 136; 38, 138 are captively and non-releasably engaged, the tool holding system 22, 1.22 has no falling parts when, example, replacing the cutting insert 24 or the collet 106. Thus, generally speaking, the inner and outer coupling members are permanently connected to one another, and cannot be separated from each other without damaging at least one of the members.

It can be seen from the foregoing that in one embodiment the least one engagement recess 62 is formed on the inner coupling member 36 while in the other embodiment the at least one engagement recess 62 is formed on the outer coupling member 138, with the at least one projection 60 being formed on the other coupling member.

Although the subject matter of the present application has been described to a certain degree of particularity, it should be understood that various alterations and modifications could be made without departing from the spirit or scope of the invention as hereinafter claimed.

What is claimed is:

1. A tool holding system (22, 122), having a tool holding system central axis (A) defining opposite forward and rear directions (DF, DR), the tool holding system (22, 122) comprising:
    a clamping portion (28) comprising:
        an integrally formed one-piece inner coupling member (36, 136) forming at least part of a clamping sleeve portion (30) having a clamping bore (32), for clampingly receiving a cutting insert (24), the clamping bore (32) opening out at a forward end (34) of the tool holding system (22, 122), the inner coupling member (36, 136) having a radially outwardly facing a first engagement surface (56); and
        an integrally formed one-piece outer coupling member (38, 138) having a radially inwardly facing second engagement surface (58); and
    a mounting portion (26) connected to one of the inner and outer coupling members (36, 136; 38, 138); wherein
    the outer coupling member (38, 138) is circumferentially disposed about at least a portion of the inner coupling member (36, 136), with the first engagement surface (56) facing the second engagement surface (58);
    the inner and outer coupling members (36, 136; 38, 138) are permanently connected to one another, and are captively and non-releasably engaged with each other via inter-engaged first and second engagement surfaces (56, 58);
    the first and second engagement surfaces (56, 58) are slidingly displaceable with respect to each other to adjust the inner and outer coupling members between locked and released positions.

2. The tool holding system (22, 122), according to claim 1, wherein:
    the first and second engagement surfaces (56, 58) extend circumferentially about the too holding system central axis (A); and
    the first and second engagement surfaces (56, 58) are slidingly displaceable with respect to each other in a circumferential direction (S) about the tool holding system central axis (A).

3. The tool holding system (22), according to claim 2, wherein:
    the first and second engagement surfaces (56, 58) are slidingly displaceable with respect to each other in the circumferential direction (S) by no more than 50°.

4. The tool holding system (22), according to claim 1; wherein:
    the first engagement surface (56) comprises at least one engagement recess (62) recessed therein;
    the second engagement surface (58) comprises at least one engagement projection (60) projecting therefrom; and
    each engagement projection (60) is located in a respective engagement recess (62).

5. The tool holding system (22), according to claim 4, wherein:
    the at least one engagement projection (60) comprises a plurality of angularly spaced apart engagement projections (60) arranged in at least one axial projection row; and
    the at least one engagement recess (62) comprises a plurality of angularly spaced apart engagement recesses (62) arranged in at least one axial recess row.

6. The tool holding system (22), according to claim 4, wherein:
    each engagement recess (62) comprises a central recess bottom surface (66);
    each recess bottom surface (66) comprises a recess clearance surface (68) and a recess abutment surface (70) adjacent thereto in the circumferential direction (S); and
    the recess abutment surface (70) is located further from the tool holding system central axis (A) than the recess clearance surface (68) in the radial direction.

7. The tool holding system according to claim 6, wherein:
    each engagement projection (60) comprises a central projection top surface (74);
    each projection top surface (74) has a constant radial distance (D) from the tool holding system central axis (A).

8. The tool holding system (122), according to claim 1, wherein:
    the first engagement surface (56) comprises at least one engagement projection (60) projecting therefrom;
    the second engagement surface (58) comprises at least one engagement recess (62) recessed therein; and
    each engagement projection (60) is located in a respective engagement recess (62).

9. The tool holding system (122), according to claim 8, wherein:
    the at least one engagement recess (62) comprises an annular groove (108); and
    the at least one engagement projection (60) comprises an annular ridge (110).

10. The tool holding system (22), according to claim 1, wherein the outer coupling member (38) forms a tightening nut (54).

11. The tool holding system (22), according to claim 1, wherein the inner coupling member (36, 136) is integrally connected with the mounting portion (26) forming a tool body (39) having a one-piece construction.

12. The tool holding system (122), according to claim 1, wherein:
the outer coupling member (138) comprises a radially inwardly facing outer threaded portion (98);
the mounting portion (26) comprises a radially outwardly facing mounting threaded portion (100); and
the outer threaded portion (98) is threadingly engaged to the mounting threaded portion (100).

13. The tool holding system according to claim 1, wherein the inner coupling member (36) forms in entirety the clamping sleeve portion (30).

14. The tool holding system (122), according to claim 1, wherein:
the inner coupling member (136) forms a sliding collet ring (102);
the clamping sleeve portion (30) further comprises a collet (106) that is releasable, attached to the inner coupling member (136); and
the clamping bore (32) is located in the collet (106).

15. The tool holding system (22, 122), according to claim 1, further comprising at least one coolant channel (76) opening out at the forward end (34) of the tool holding system (22, 122).

16. The tool holding system (22), according to claim 15, wherein each coolant channel (76) is formed in the inner coupling member (36) and extends an entire axial length thereof.

17. The tool holding system (22), according to claim 16, wherein:
the inner coupling member (36) comprises at least one axially extending coolant ridge (78); and
each coolant channel (76) is located in a coolant ridge (78).

18. The tool holding system (22), according to claim 17, wherein:
the first engagement surface (56) comprises a plurality of angularly spaced apart engagement recesses (62); and
members of each pair of circumferentially adjacent engagement recesses (62) are separated by a respective coolant ridge (78).

19. The tool holding system (122), according to claim 15, wherein:
the inner coupling member (136) comprises a coolant groove (114) that extends the entire axial length of the inner coupling member (136); and
each coolant channel (76) is formed by the coolant groove and the outer coupling member (138).

20. A cutting tool (20, 120), comprising:
a tool holding system (22, 122) in accordance with claim 1; and
a cutting insert (24) located in the clamping bore (32) and clampingly engaged therein.

21. The cutting tool (20), according to claim 20 wherein:
the first engagement surface (56) comprises at least one engagement recess (62);
the second engagement surface (58) comprises at least one engagement projection (60);
each engagement projection (60) is located in a respective engagement recess (62);
each engagement recess (62) comprises a central recess bottom surface (66);
each recess bottom surface (66) comprises a recess clearance surface (68) and a recess abutment surface (70) adjacent thereto in the circumferential direction (S); and
the recess abutment surface (70) is located further from the tool holding system central axis (A) than the recess clearance surface (68), in the radial direction;
each engagement projection (60) comprises a central projection top surface (74);
each projection top surface (74) has a constant radial distance (D) from the tool holding system central axis (A); and
each projection top surface (74) abuts a respective recess abutment surface (70).

22. The cutting tool (20), according to claim 21 wherein:
the inner coupling member (36) forms in entirety the clamping sleeve portion (30).

23. The cutting tool (120), according to claim 20 wherein:
the inner coupling member (136) forms a sliding collet ring (102);
the clamping sleeve portion (30) further comprises a collet (106) that is releasably, attached to the inner coupling member (136); and
the clamping bore (32) is located in the collet (106).

24. A method of manufacture and assembly of a tool holding system (22, 122) having a tool holding system central axis (A) defining opposite forward and rear directions (DF, DR), the method comprising:
manufacturing a mounting portion (26);
manufacturing, by using an additive manufacturing process, a clamping head part (80, 180) comprising:
inner and outer coupling members (36, 136; 38, 138) connected to one another;
at least one connecting portion (92) connecting the inner and outer coupling members (36, 136; 38, 138);
an annular separation cavity (94) bounded by the inner and outer coupling members (36, 136; 38, 138) and the at least one connecting portion (92); and
a clamping head bore (88) opening out to at least the clamping head forward end surface (82) of the clamping head part (80, 180);
separating the clamping head part (80, 180) into:
an integrally formed one-piece inner coupling member (36, 136) forming at least part of a clamping sleeve portion (30) and having a clamping bore (32) opening out at a forward end (34) of the tool holding system (22, 122), the inner coupling member (36, 136) having a radially outwardly facing a first engagement surface (56); and
an integral formed one-piece outer coupling member (38, 138) circumferentially disposed about at least a portion of the inner coupling member (36,36), the outer coupling member (38, 138) having a radially inwardly facing second engagement surface (58) which faces the first engagement surface (56); wherein:
the inner and outer coupling members (36, 136; 38, 138) are permanently connected to one another, and are captively and non-releasably engaged with each other via the first and second engagement surfaces (56, 58); and
connecting the clamping head part (80, 180) to the mounting portion (26).

25. The method according to claim 24, comprising manufacturing the clamping head part (80, 180) to have exactly two connecting portions (92) connecting the inner and outer coupling members (36, 136; 38, 138) so that the separation cavity (94) is entirely closed.

26. The method according to claim 24, wherein the step of separating the clamping head part (80, 180) into the inner and outer coupling members (36, 136; 38, 138) comprises removing the at least one connecting portion (92).

27. The method according to claim 26, wherein the step of removing the at least one connecting portion (92) comprises:
   i) in the clamping head part (80, 180), face grooving a separation groove (96) which extends to the separation cavity (94); or
   ii) grinding the clamping head part (80, 180) to the separation cavity (94); or
   iii) in the clamping head part (80, 180), external grooving a separation groove (96) which extends to the separation cavity (94); or
   iv) in the clamping head bore (88), internal grooving a separation groove (96) which extends to the separation cavity (94).

28. The method according to claim 24, comprising manufacturing the mounting portion (26) with a non-additive manufacturing process.

29. The method according to claim 24, comprising manufacturing the mounting portion (26) with an additive manufacturing process.

30. The method according to claim 24, comprising connecting the clamping head part (80) to the mounting portion (26) by additively manufacturing the clamping head part (80) directly onto the mounting portion (26).

31. The method, according to claim 24, comprising connecting the clamping head part (80) to the mounting portion (26) by manufacturing the mounting portion (26) and the clamping head part (80) together in a single additive manufacturing process.

32. The method, according to claim 24, comprising:
   manufacturing the mounting portion (26) and the clamping head part (80) separately; and
   then connecting the clamping head part (80) to the mounting portion (26).

33. The method, according to claim 24, further comprising:
   releasably attaching a collet (106) to the inner coupling member (136) after separating the clamping head part (180) into the inner and outer coupling members (136, 138); wherein:
   connecting the clamping head part (180) to the mounting portion (26) comprises threadingly attaching the outer coupling member (138) to the mounting portion (26) after releasably attaching the collet (106) to the inner coupling member (136).

34. A tool holding system (22, 122), having a tool holding system central axis (A) defining opposite forward and rear directions (DF, DR), the tool holding system (22, 122) comprising:
   a clamping portion (28) comprising:
      an integrally formed one-piece inner coupling member (36, 136) forming at least part of a clamping sleeve portion (30) having a clamping bore (32), for clampingly receiving a cutting insert (24), the clamping bore (32) opening out at a forward end (34) of the tool holding system (22, 122), the inner coupling member (36, 136) having a radially outwardly facing a first engagement surface (56); and
      an integrally formed one-piece outer coupling member (38, 138) having a radially inwardly facing second engagement surface (58); and
   a mounting portion (26) connected to one of the inner and outer coupling members (36, 136; 38, 138); wherein
   the outer coupling member (38; 138) is circumferentially disposed about at least a portion of the inner coupling member (36; 136), with the first engagement surface (56) facing the second engagement surface (58);
   the inner and outer coupling members (36, 136; 38, 138) are permanently connected to one another, and are captively and non-releasably engaged with each other, without the use of a separate retaining element keeping the two together; and
   the first and second engagement surfaces (56, 58) are slidingly displaceable with respect to each other to adjust the inner and outer coupling members between locked and released positions.

* * * * *